(No Model.) 2 Sheets—Sheet 1.
H. H. UCKOTTER.
VEHICLE SEAT AND TOP SUPPORT.
No. 584,971. Patented June 22, 1897.
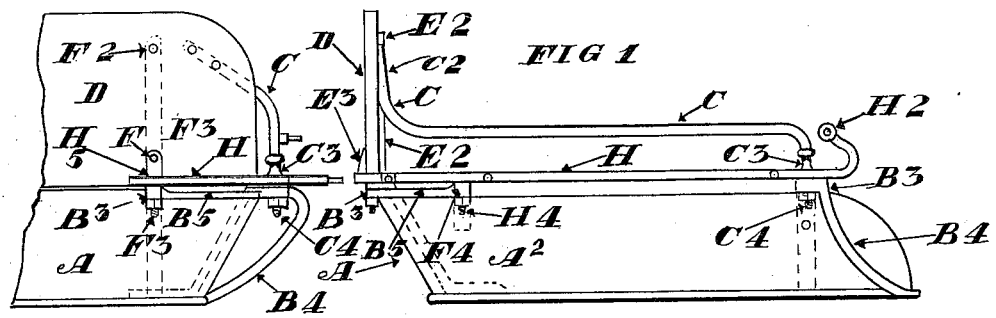
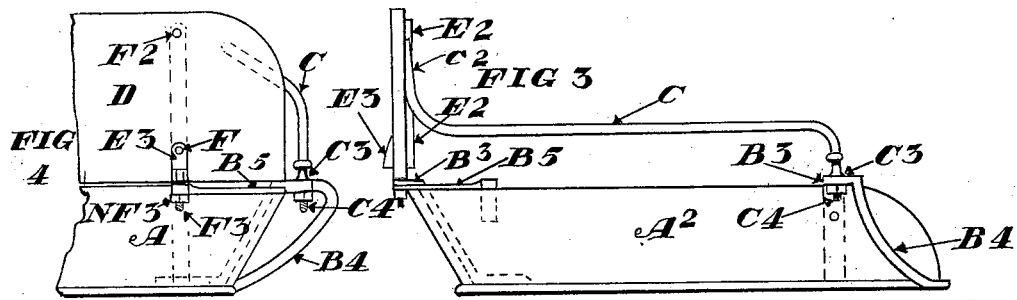
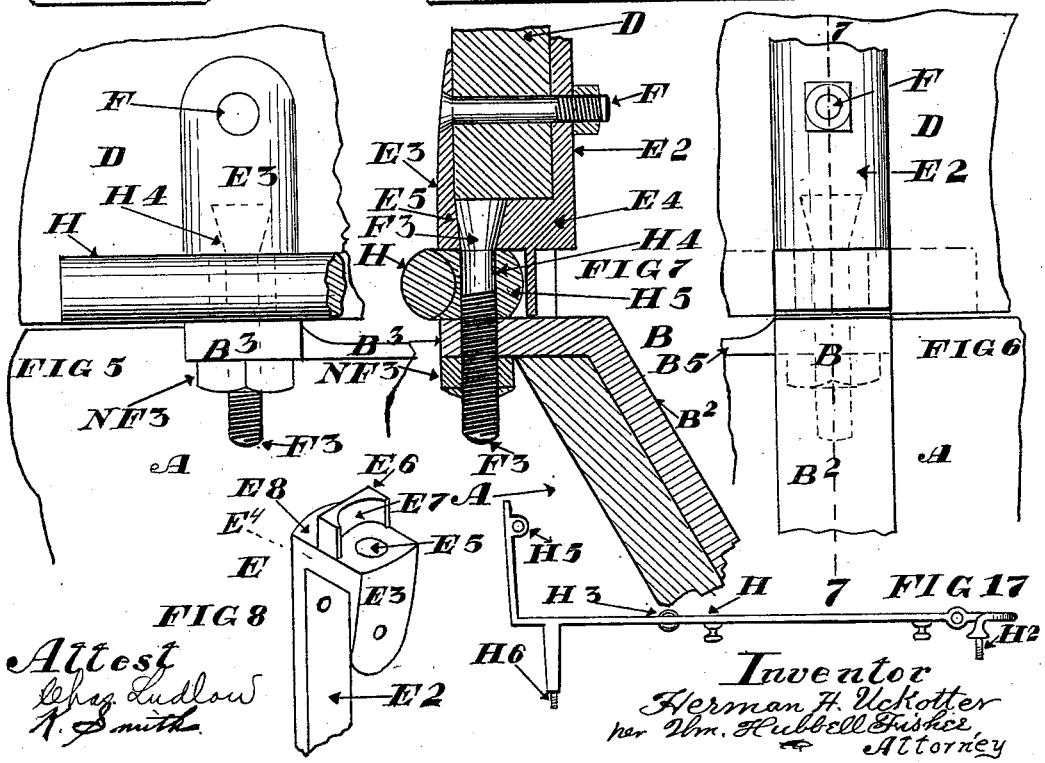

(No Model.) 2 Sheets—Sheet 2.
H. H. UCKOTTER.
VEHICLE SEAT AND TOP SUPPORT.
No. 584,971. Patented June 22, 1897.
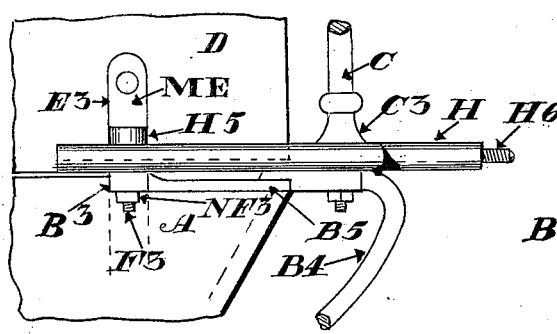
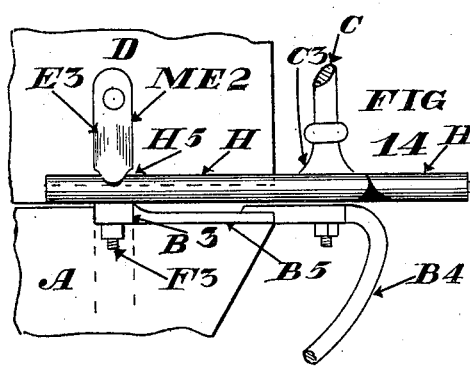
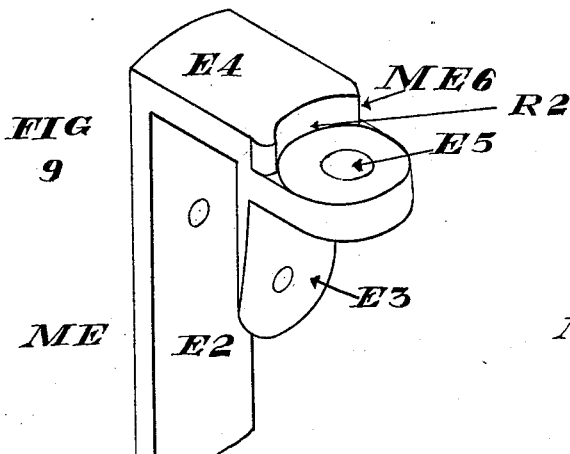
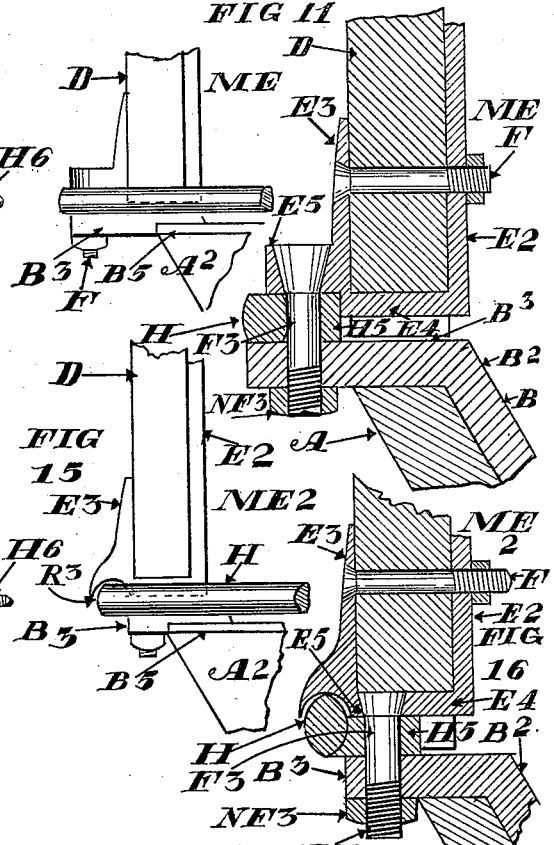
Attest
Chas. Ludlow
N. Smith
Inventor
Herman H. Uckotter
per Wm. Hubbell Fisher
Attorney

UNITED STATES PATENT OFFICE.

HERMAN H. UCKOTTER, OF CINCINNATI, OHIO, ASSIGNOR TO ANCHOR BUGGY CO., OF SAME PLACE.

VEHICLE SEAT AND TOP-SUPPORT.

SPECIFICATION forming part of Letters Patent No. 584,971, dated June 22, 1897.

Application filed February 26, 1896. Serial No. 580,839. (No model.)

*To all whom it may concern:*

Be it known that I, HERMAN H. UCKOTTER, a citizen of the United States, and a resident of the city of Cincinnati, in the county of Hamilton and State of Ohio, have invented certain new and useful Improvements in Constructions Relating to the Combination of Vehicle Seats, Backs, and Supports for Vehicle-Tops, of which the following is a specification.

One of the principal objects of my invention is a novel and admirable construction whereby a seat, seat-back, and support for the vehicle-top may be quickly and readily combined and the vehicle-top support be disconnected from the seat and back without altering the relative location of the latter parts and without injuring the finish of the job, but on the contrary at all times preserving the handsome appearance of the parts singly and in conjunction.

The several features of my invention and the various advantages resulting from their use conjointly or otherwise will be apparent from the following description and claims.

In the accompanying drawings, making a part of this specification, Figure 1, Sheet 1, is an elevation of the end of a seat, with lazy-back, hand-rail, and iron for partly supporting the top, and other irons, illustrating my improvements. Fig. 2 is a rear view of the same parts at the left-hand end of the seat. The presentation of the right-hand portion of the seat and back and irons is omitted because they are only a duplication of the parts shown. Fig. 3 is the same view as Fig. 1, except that the vehicle-top-supporting rail is absent, having been removed. Fig. 4 is the view of Fig. 1, except that said vehicle-top-supporting rail is omitted, the seat and hand-rail being secured in place. Fig. 5 is an enlarged rear view of certain details. Fig. 6 is a front view of the same. Fig. 7 is a vertical central section of the same, taken in the plane of the dotted line 7 7 of Fig. 6, the bolts at the section being left in elevation. Fig. 8 is a view on a diminished scale in isometric perspective of the lower end of the seat-iron. Fig. 9, Sheet 2, is a view in isometric perspective of the lower end of a seat-iron, which is a modification of the seat-iron shown in Figs. 1 to 8. Figs. 10, 11, and 12 are respectively rear, end, and sectional views of the parts shown in Figs. 1 and 2, excepting that the seat-iron in Fig. 9 is in the views Figs. 10, 11, and 12 substituted for the seat-iron shown in Figs. 1 to 8. Fig. 13 is a view in isometric perspective of the lower end of a seat-iron, which shows a modified form of the seat-iron shown in Fig. 8. Figs. 14, 15, and 16 are respectively rear, side, and sectional views of the parts shown in Figs. 1 and 2, the seat-iron of Fig. 13 being substituted for the seat-iron of Fig. 8.

A indicates the low back, and $A^2$ the low end, of the ordinary carriage-seat. A cushion is very commonly used on the bottom of such a seat and is held in place by the back A and ends $A^2$. The back and ends of the seat carry the usual seat-irons B, whose shanks $B^2$ lie against the more vertical portions of said back and ends and are bolted thereto in the usual manner, while the upper end $B^3$ of this iron B laps over and lies horizontally on the upper edge of the seat-back or seat end, to which it (the iron) may be attached. In ordinary cases two of these seat-irons B are attached to the seat-back A and two to each seat end $A^2$, and the adjacent seat-irons of the back and of the end are connected by an iron strip $B^5$, which rests on the upper edge of the back and end between said irons. This strip $B^5$ is usually integral with the said seat-irons B B and materially assists in holding the adjacent seat end to the seat-back at their (corner) junction. That one of the seat-irons B which is nearest the back A usually has a short shank, for the reason that less strain is present at this point.

One end of each arm-rail C is secured at at $C^2$ to the lazy-back D, and the other end extends forward parallel to the end of the seat and is adapted to be secured at $C^3$ to the front seat-iron $B^3$. The preferred means for thus securing the arm-rail to said iron consists of a long screw-bolt $C^4$, fixed to or integral with the arm-rail C and extending down so as to pass through the said seat-iron.

$B^4$ indicates a handle, one of which is usually present and connected to the forward seat-iron on each end, also below to the seat itself. The uses of this ordinary handle are well known and require no description.

I will now proceed to describe the lazy-back irons E, best form, Sheet 1. These irons are employed to secure the lazy-back to the seat. Usually two of them are present, respectively connected to the opposite end portions of the seat-back. Each of these lazy-back irons E has a long shank $E^2$, applied to the front side of the lazy-back, and a shank $E^2$, applied to the rear side of the back. Immediately below the lower edge of the back these two shanks are united by a cross-piece or bridge $E^4$. The lower portion of the back fits closely between these shanks and rests on the cross-piece $E^4$. (See particularly section Fig. 7.) The seat-iron E and the back are united together by a bolt F, passing through the back and the shanks $E^2$ and $E^3$. The shank $E^2$ is farther up united to the seat-back by a bolt $F^2$.

A screw-bolt $F^3$ projects downwardly from the end of the iron E. Preferably this screw-threaded projection $F^3$ is not integral with the lazy-back iron E, but is separated and is located therein, as shown, the head of this threaded projection $F^3$ being beveled and the hole $E^5$ of the iron E being countersunk to admit and hold the head of the screw F in place and flush with the top of the bridge $E^4$. From the lower end of the iron E extends downward a projection $E^6$, whose function is to keep the lazy-back at a given distance—viz., a very slight one above the tops of the ends and back of the seat, and to keep the bridge $E^4$ of the iron E at a given distance from the top of the seat-iron. The purpose of such construction is to enable the lazy-back iron E to sustain at all times the lazy-back as aforesaid and to allow room for the attachment of the shifting rail (to which the vehicle-top is attached) at a location adjacent to the junction of the top of the seat-back and the lower edge of the lazy-back and also to allow the removal of said shifting rail without changing the height of the lazy-back above the seat and also without depending upon the shifting rail when the latter is in place adjacent to the junction of the seat and lazy-back for any support of the latter. At the same time the construction is such that the shifting rail can be readily inserted in place and as readily removed therefrom. Other features of construction illustrated by the drawings and set forth in the description shortly to be given will receive consideration.

The shifting rail H is bent down in front and at its front terminus provided with an eye $H^2$ for attachment to the forward bow-iron of the vehicle-top. The rail H is bolted forward to the adjacent seat-iron $B^3$ by the bolt $C^4$, passing from the arm-rail C through the shifting rail H and the seat-iron. The side of the rail extends along above the edge of the end of the seat and has a perforated foot $H^3$, (see Fig. 17,) which latter rests on the adjacent seat-iron $B^3$. A bolt $H^4$, passing through the foot $H^3$ and the top of the seat-iron $B^3$, there secures the shifting rail to the seat. A projection $H^6$ from the rail affords means for connecting the rear iron of the vehicle-top to the rail. The shifting rail H thence continues to the corner of the seat and then turning goes along the back over the back edge of the seat until it reaches the adjacent lazy-back iron. There, at $H^5$, it is perforated to receive the bolt $F^3$ of the lazy-back iron E. This bolt passes through the shifting rail and the seat-iron below and receives a nut $NF^3$, which latter, when screwed up, holds the lazy-back and shifting rail firmly to the seat-iron, and consequently to the seat.

The projection $E^6$ of the seat-iron upholds the latter from touching the shifting rail H. Ordinarily the shifting rail will be narrow and in such event will have an enlargement $H^5$ where the bolt $F^3$ is to pass through it. This enlargement, for the sake of symmetry and good appearance and for carrying the rail in a plane behind the lazy-back and yet keep the iron E within the plane of the rear of the lazy-back, will be on that side of the rail which is toward the seat, substantially as shown. The projection $E^6$ of the seat-iron will then be formed with a concave recess $E^7$ in order to more closely receive and compactly there combine with the shifting rail. In the preferred form of seat-iron E the front portion of the iron is cut away at $E^8$ to save metal.

It is to be noted that the lazy-back is cut away or recessed where the projection $E^6$ is located and also where the enlargement $H^5$ of the rail is present. (See more particularly Figs. 4 and 7.)

In the vehicle as now manufactured the shifting rail is in one piece and, commencing at one forward corner of one end of the seat, passes along the outer side of that end and then along the back to the other end and along the side of that end to the end front corner thereof. My invention changes this construction and makes the rail in two pieces, each substantially as already described. Thus a large portion of the back of the seat and back from the center each way is free from the presence of the rail. The ends of the respective portions of the rail in the vicinity of where they are secured at the back to the seat and back irons are well covered by those parts of the top known as the "back-stays," so that as long as the top is on the wagon these parts are covered. The part of the back and seat covered by the curtain when unrolled and fastened down is uncovered when the curtain is rolled up or otherwise elevated and fastened up. This uncovered portion is without a shifting rail to mar its finish and beauty. The lower edge of the lazy-back is adjusted as and by the means shown to project somewhat rearward beyond the upper adjacent edge of the seat A, thus adding to the elegance of the appearance of the construction.

In removing the shifting rail the nuts of the bolts $C^4$, $H^4$, and $NF^3$ are removed. The lazy-back is then lifted up and the shifting rail is then removed. The lazy-back is then immediately replaced, the bolt $F^3$ of the lazy-back iron going through the same seat-iron it did when the shifting rail was present and its nut being screwed thereon and the bolts $C^4$ connecting the arm-rail to the seat. The lazy-back is now again in place. In a reverse manner the shifting rail is replaced in position on the seat and close to the lazy-back.

It will be observed that the lazy-back is at the same distance from the seat at all times and that its position relative to the seat is unaltered by the presence or absence of the shifting rail.

It now remains to describe those modifications of the seat-iron to which general reference has been made. The iron ME has the perforation $E^5$ farther to the rear, and the bridge $E^4$ is not so deep as to take the weight of the seat off from the shifting rail when the latter is in position on the vehicle. It has, however, a shoulder $ME^6$, which bears against the shifting rail and assists in keeping it in place and relieves the bolt $F^3$ from a portion of the strain which it would otherwise receive. The shifting rail is located in the recess $R^2$. The part where the bolt $F^3$ passes through the iron ME is extended out rearward, as shown. In the modified iron $ME^2$ the bolt $F^3$ passes through the bridge $E^4$. A side extension of the shank beneath part $E^3$ contains the recess $R^3$, which latter receives the upper half of the periphery of the shifting rail at this point. The iron $ME^2$ rests upon the shifting rail while the latter is in position. The comparative advantages of these several lazy-back irons are now obvious.

What I claim as new and of my invention, and desire to secure by Letters Patent, is—

1. As a new article of manufacture, a lazy-back iron provided with means for attachment to the back and having the cross-piece $E^4$, provided with shanks $E^2$, $E^3$, and perforated at $E^5$, and having the bolt $F^3$, and the projection $E^6$, in depth the thickness of the shifting iron, substantially as and for the purposes specified.

2. As a new article of manufacture, a lazy-back iron E provided with means for attachment to the back and having the cross-piece $E^4$, provided with shanks $E^2$, $E^3$, and perforated at $E^5$, and having the bolt $F^3$, and the projection $E^6$, in depth the thickness of the shifting iron, the projection $E^6$ being recessed at $E^7$ to receive the round of the shifting rail, substantially as and for the purposes specified.

3. The combination of the back and the seat, and the shifting rail having enlargement $H^5$, arranged to come between the seat and the back, and the seat-iron below, and the seat-back iron above, the latter having the connecting-bolt $F^3$, and the projection $E^6$ beneath the seat-back, and above the seat-iron, the bolt $F^3$ adapted to connect with the seat-iron and the shifting rail by passing through the latter into the former, substantially as and for the purposes specified.

4. The combination of the back and the seat, and the shifting rail having enlargement $H^5$, arranged to come between the seat and the back, and the seat-iron below, and the seat-back iron above, the latter having the connecting-bolt $F^3$, and the projection $E^6$ beneath the seat-back and above the seat-iron, and recessed to receive the enlargement $H^5$ of the shifting rail, and the bolt $F^3$ connecting the seat-iron, and the shifting rail, and the seat-iron, substantially as and for the purposes specified.

5. As a new article of manufacture, a lazy-back iron provided with means for attachment to the back and having a shank bolted to the side of the back and a piece extending under the bottom edge of the back, and perforated at $E^5$, and having the vertical projection extending down by the shifting iron, and bolt passing through perforation $E^5$, and having its head countersunk therein, the eye of the shifting iron receiving this bolt and located beneath the seat-back, substantially as and for the purposes specified.

HERMAN H. UCKOTTER.

Attest:
WM. E. JONES,
K. SMITH.